United States Patent [19]

Nyfeldt et al.

[11] 4,211,659
[45] Jul. 8, 1980

[54] DEVICE FOR COLLECTING MATERIALS AS FOR EXAMPLE OIL FLOATING ON A WATER SURFACE

[76] Inventors: Knud H. Nyfeldt, Hus 235, Box 20, S-430 82 Donsö, Sweden; Klas T. Y. Bernhardsson, Hus 81, S-430 92 Fotö, Sweden

[21] Appl. No.: 6,170

[22] Filed: Jan. 24, 1979

[30] Foreign Application Priority Data

Feb. 2, 1978 [SE] Sweden ................................ 7801236

[51] Int. Cl.² ...................... B01D 29/10; B01D 33/00
[52] U.S. Cl. ......................... 210/242 S; 210/DIG. 25; 210/DIG. 26
[58] Field of Search ................... 43/7, 9, 104; 210/83, 210/241, 242, 242 S, DIG. 25, DIG. 26

[56] References Cited

U.S. PATENT DOCUMENTS

| 3,653,510 | 4/1972 | Fitzgerald | 210/DIG. 25 |
| 3,686,870 | 8/1972 | Blomberg | 210/DIG. 25 |
| 3,771,662 | 11/1973 | Muramatsu et al. | 210/DIG. 25 |

FOREIGN PATENT DOCUMENTS

710520  6/1965  Canada ............................................ 43/9

*Primary Examiner*—Frank Sever

[57] ABSTRACT

An apparatus is described for collecting materials, such as oil floating on water, wherein the materials are funnelled into a collecting device by floating walls towed through the water, the collecting device being a succession of hose-shaped sections detachably interconnected to each other so that the trailing end section may be pursed sealed and detached when a sufficient amount of the collected material is received thereby.

3 Claims, 10 Drawing Figures

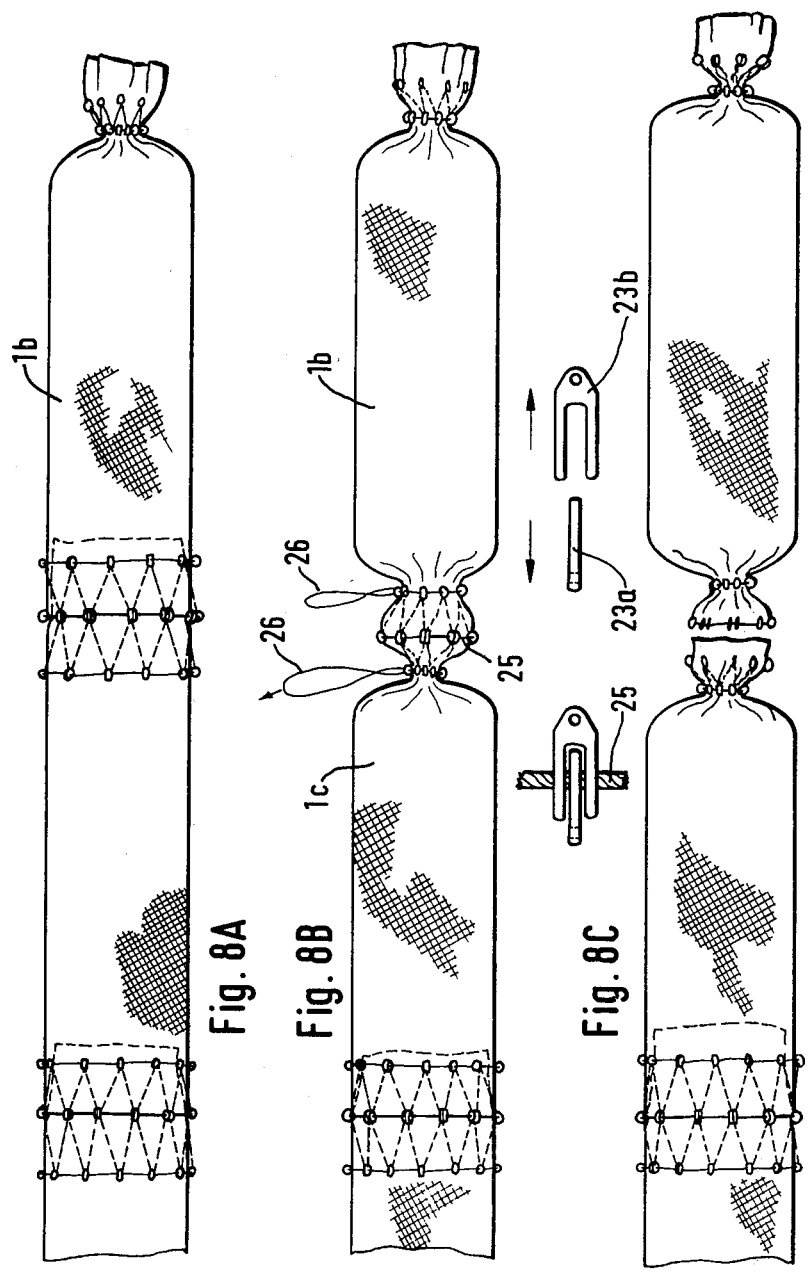

DEVICE FOR COLLECTING MATERIALS AS FOR EXAMPLE OIL FLOATING ON A WATER SURFACE

The present invention relates to a device for collecting materials, as for example oil, floating on a water surface.

It is a principal object of the invention to provide a device of the kind mentioned above, by means of which an efficient collection of the materials in question and an efficient separation of these materials from the water, in which the materials are floating, is made possible.

This object is reached by means of a device according to the present invention, which substantially is characterized by comprising a wall, which in the condition of use of the device occupies an upright position cutting the surface of the water, which wall at least partially comprises nets and is supported by ropes extending along its horizontal upper and lower edges, and by stays bridging the vertical distance between said ropes, which stays permit a bulging of the portion of the wall positioned between the ropes along the main portion of the length of the netwall in order to form a channel, which runs substantially parallel to and along the same, and intended to guide the materials in question towards collecting means provided at the rear of said device, said stays freely extending from the net between said ropes, which also form the edges of the walls of the channel.

Figure 1:
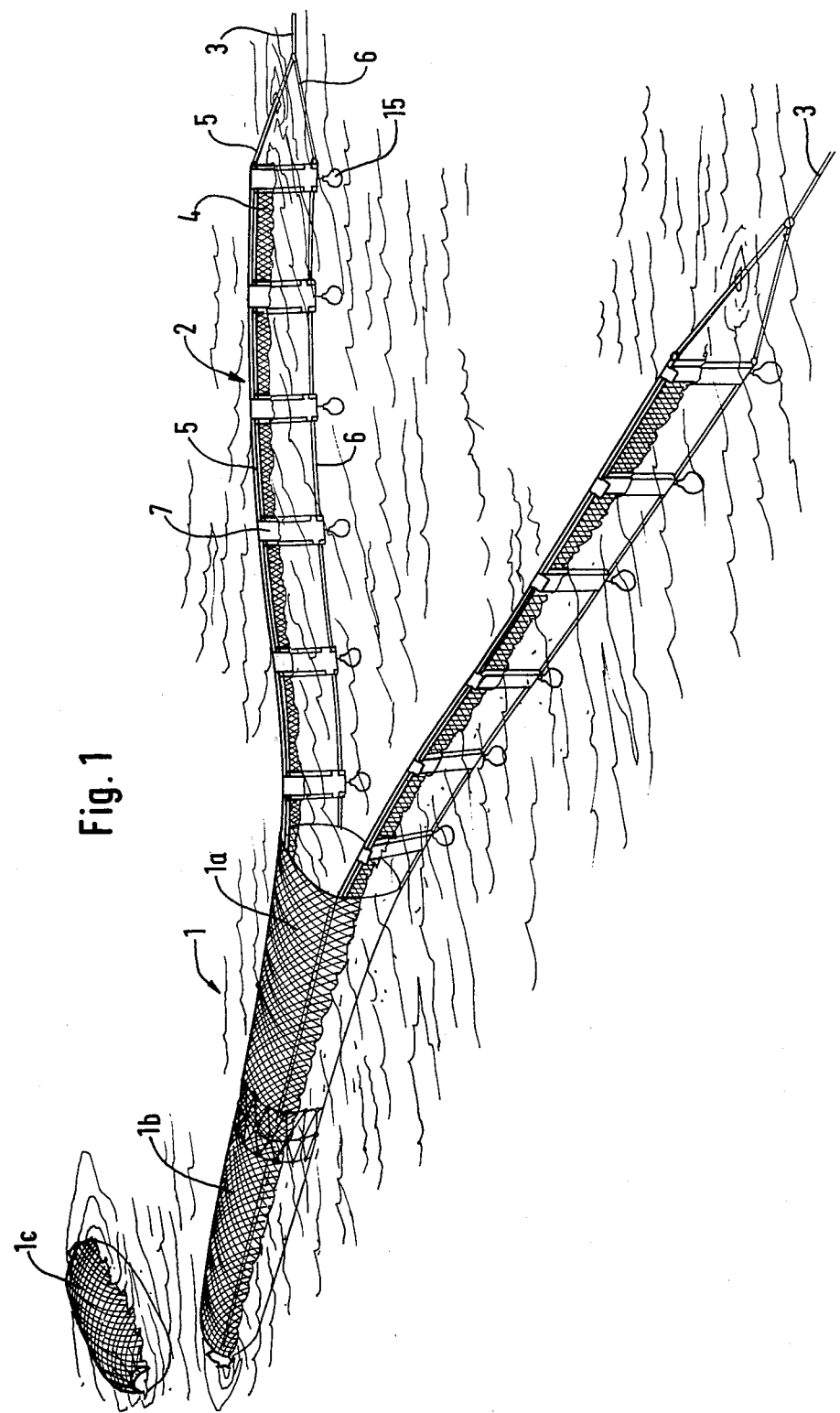
Figure 2:
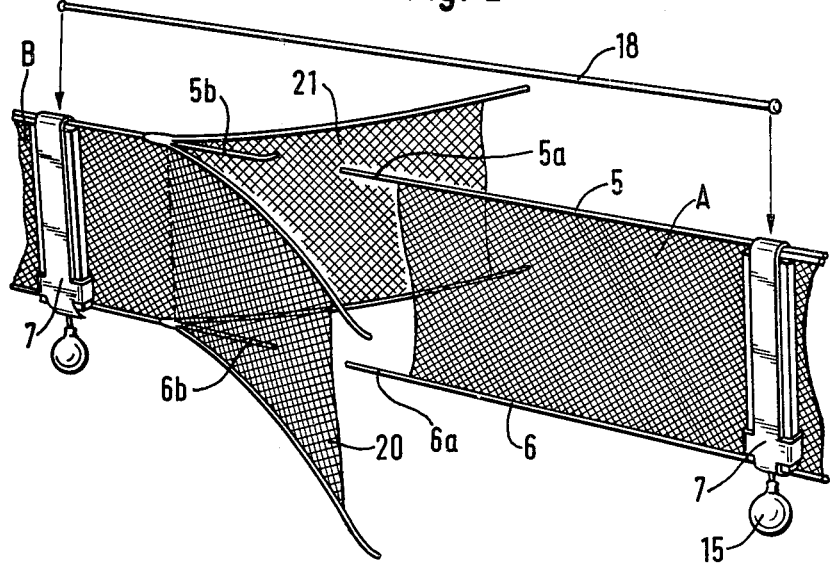
Figure 3:
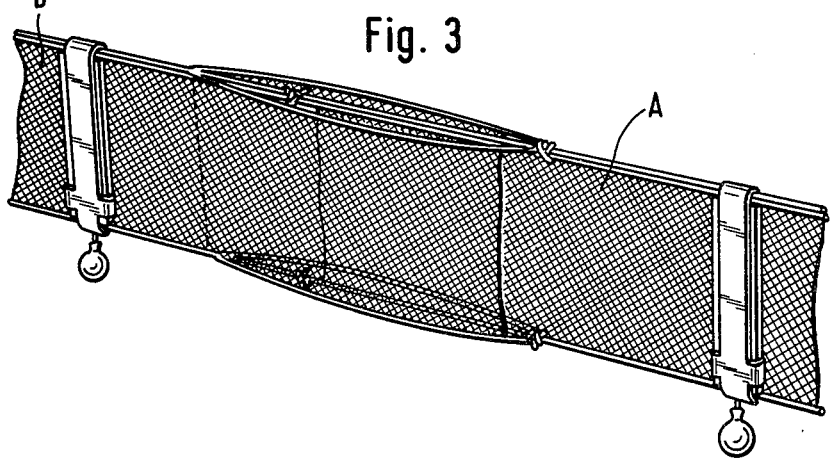
Figure 4:
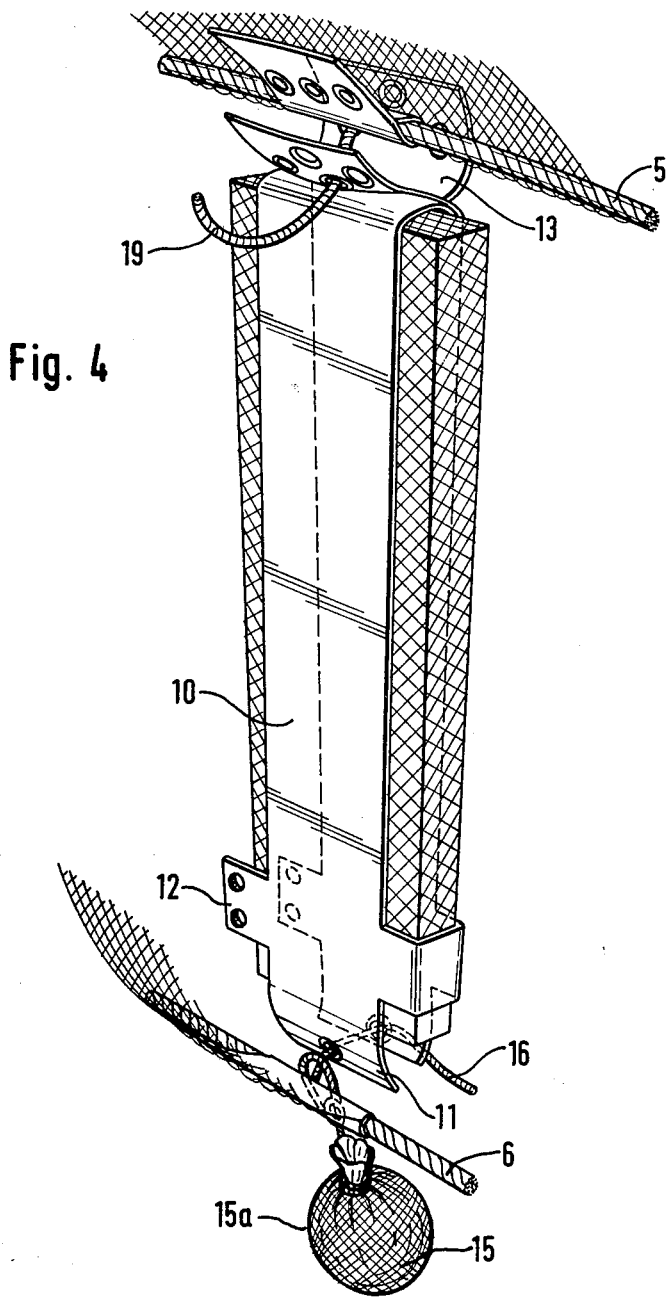
Figure 5:
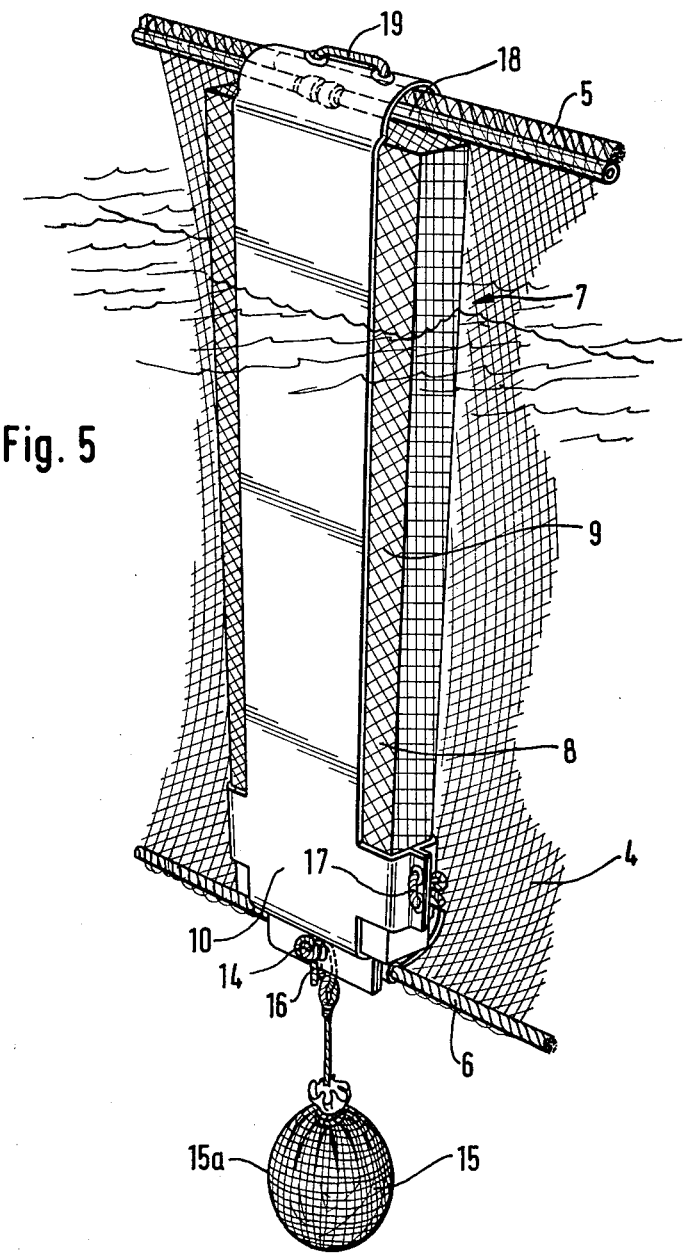
Figure 6:
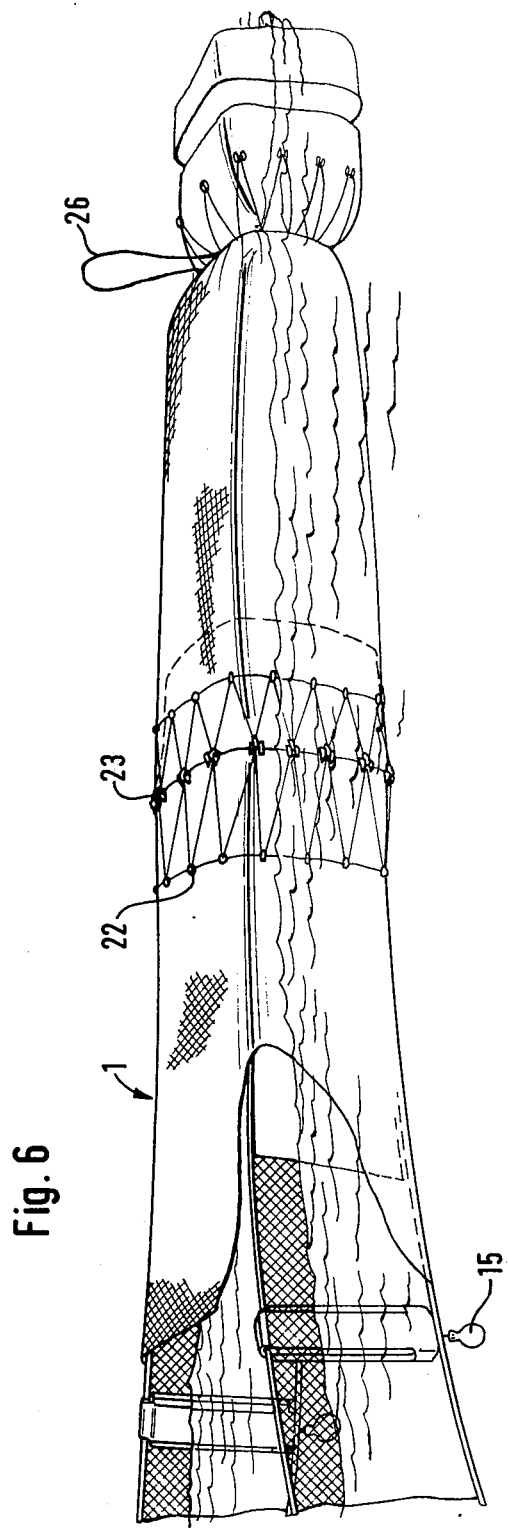
Figure 7:
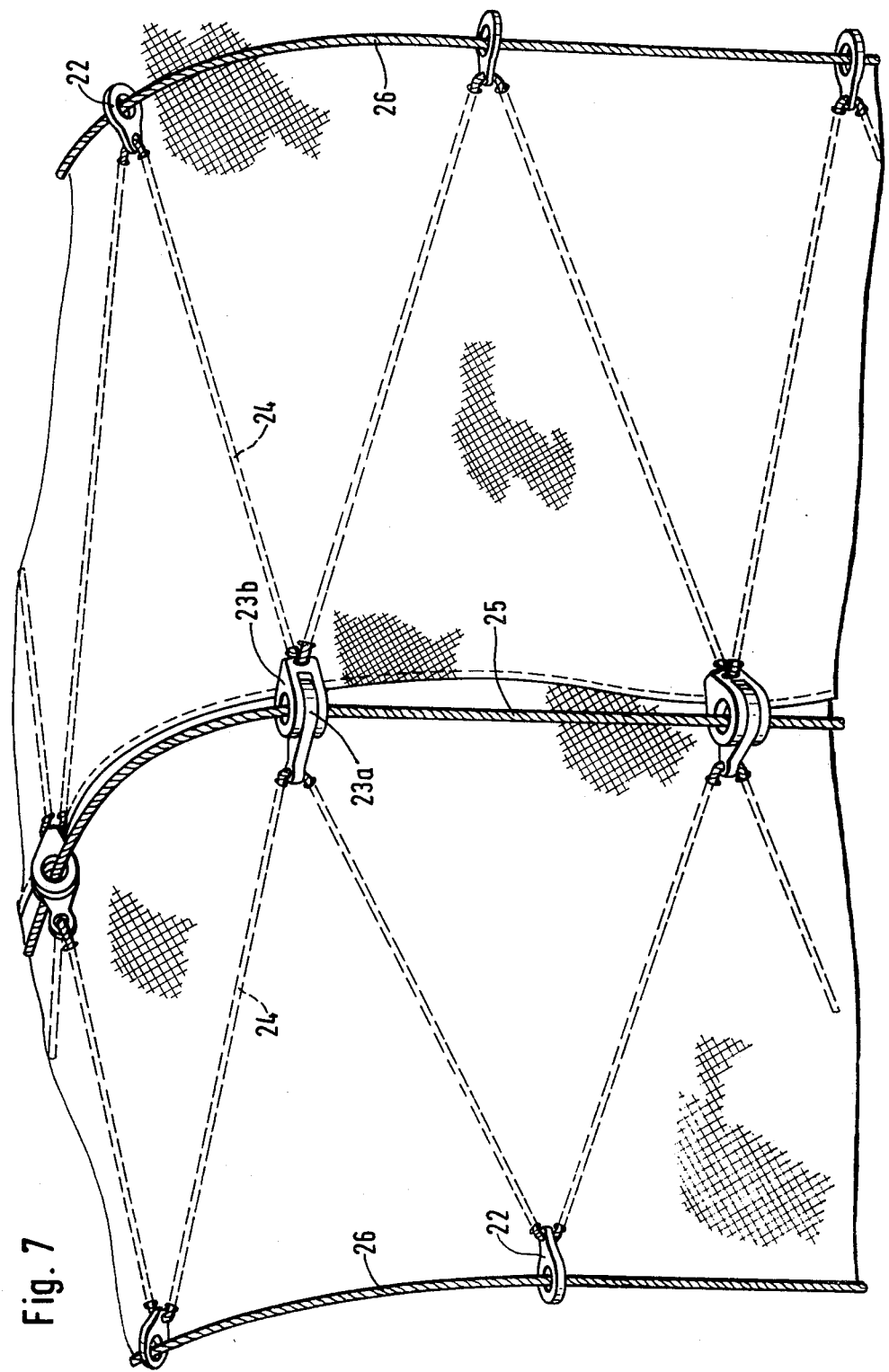

In the following an example of embodiment of the invention will be described, reference being made to the accompanying drawings, in which FIG. 1 is a perspective view of a collecting device made according to the invention, FIG. 2 shows a connecting piece serving the purpose to bind together sections of the collecting device before the coupling together operation, FIG. 3 shows the same connecting piece in coupled-together condition, FIG. 4 is a detailed view of a floating body forming part of the collecting device while being mounted, FIG. 5 shows the same floating body in mounted condition, FIG. 6 is a side elevational view of the rear portion of the collecting device, FIG. 7 is a view on an enlarged scale showing a detail forming part of FIG. 6, and the FIGS. 8A–C show three stages of the operation of separation of a section forming part of the rear portion of the collecting device for its disposal-transportation together with its contents.

The collecting device shown in the drawings and designed according to the invention is provided with two diverging portions 2 extending from a rear collecting portion, in its entirety indicated by 1, in forwards direction, i.e. to the right according to FIG. 1, which portions 2 at the rear are connected each one with its opposing side of the collecting portion 1, and which at their front are provided with means for the towing of the collecting device, by way of example by two boats, which are connected by towing wires indicated with 3. Each one of the collecting device portions 2 is formed by a wall of nets standing upright in the water and at its top and bottom having a hem, in which an upper edge rope 5 and a lower edge rope 6 respectively are enclosed, which at the front are pursed up and connected with the towing wire 3. The net 4 is in the form of a mesh, which is adjusted in such a manner that it has a comparatively good permeability to water, while particles intended for the collection in question are prevented from passing through the net. In order to collect oil, it has turned out to be of advantage to use nets with a mesh of 2–5 mm, preferably 2.5 mm. Staying bodies extending between the two edge ropes are indicated by 7, and in the illustrated example also form floating bodies. As is evident from FIGS. 4 and 5 the staying bodies 7 comprise a block 8 of such floating body material as for example cork. The floating block 8 is enclosed in a bag 9 of net material, which in turn is surrounded by a girdle 10 of suitable material, for example plastics. The girdle 10 is at its lower end, at one of its laterals, and at its upper end provided with strapping portions 11, 12 and 13 respectively, of which the lower strapping portion 11 is intended to be fastened to the lower edge rope 6 by means of a lace connection 14, which also supports a sinking-weight 15 comprising a purse 15a of net-material, which is supported by a rope 16, and which holds suitable ballast material, as for example a chain of suitable length. The lace portion 12 in the active condition of the collecting device is connected with a lace connection 17, as is shown in FIG. 5. The upper lace portion 13 is likewise attached to the upper edge rope 5 by means of a lacing line 19. For clarity's sake the stay body 7 is in FIG. 4 shown in a not entirely fastened condition, while in FIG. 5 it is shown in a completely mounted condition. In another embodiment the floating body 9 can be completely enclosed in an envelope of waterproof material, as for example plastics.

The width of the net portion 4, i.e. its extension in the vertical direction of the collecting device, is adjusted and running free from the stay bodies in such a manner that it can be bent outwards forming a bulge behind the stay bodies, so that a channel is formed, along which said impurities can move along the collecting device towards its collecting portion 1 provided at the rear. In order to stiffen the wall of the collecting device, a number of stiffening stays 18 are inserted in the upper portion of the same, the length of said stays corresponding to the distance between the centres of the adjacent stay bodies 18. The stay bodies are at their ends firmly held by the flaps of the upper lace portions 13 laid round the rope 5. (FIGS. 4 and 5)

The wall of the collecting device can be designed with several sections, which, as is evident from the FIGS. 2 and 3, at one of their ends suitably can be designed as the section indicated by A in FIG. 2, and at the other end as the section indicated by B. The section A is provided with a free end portion 5a of the rope 5 and a corresponding projecting end portion 6a of the lower rope 6. The section B is provided with a corresponding projecting portion 5b of the upper rope 5 and a similar projecting portion 6b of the lower rope 6. The two projecting end portions 5a, 5b and 6a, 6b respectively are in the coupled-together condition illustrated in FIG. 3 tied together to each other. In addition the section B is provided with two covering flaps 20 and 21 respectively intended for a certain distance to overlap the end portion of the upper section A and to be tied to the upper and lower ropes 5 and 6 respectively, as is likewise evident from FIG. 3, so that a joint is formed, which is impermeable to the materials, which are going to be collected by means of the collecting device. A spacing and stiffening bar 18 extends between the stay bodies 7 located nearest to the joint as well as in other portions of the collecting device. The bars 18 are inserted into the collecting device in connection with setting up of the same. Thus, before the setting up operation the collecting device can be kept in storage in folded-up or rolled-up condition, and in such condition it occupies comparatively little space when transported and stored.

The collecting portion 1 of the collecting device comprises a number of interconnected hose shaped pieces arranged one after the other, which at each one of their ends are provided with a number of connecting rings 23 located near to the end. The pursing rings 22 and the connecting rings 23 (FIGS. 6 and 7) are connected with each other and to the hose shaped sections by means of ropes 24 in zig-zag arrangement threaded through the net, as is best evident from FIG. 7. It is also evident from FIG. 7 that one connecting ring 23b is designed in the form of a fork, which is engaged by the connecting ring 23a of the juxtapositioned section, so that their holes occupy a position in coaxial arrangement relative to each other. The connecting rings are in between them coupled together by means of a rope 25 extending through them. The front collecting section 1a (FIG. 1) is provided with pursing rings and connecting rings at its rear end only, and the wall 2 of the collecting device extends in overlapping arrangement inside its front end portion, in the interior of which the edge ropes 5 and 6 are fastened. The separation of the filled collecting section 1 (FIG. 1) takes place from behind in the manner evident from (FIGS. 8A, 8B and 8C). The rear collecting section 1b is from the beginning pursed-up and secured at its rear end. Before separation the section 1c occupying a position ahead is pursed-up at its rear by means of its pursing rope 26, and the collecting section 1b occupying a position behind the section 1c is pursed-up by means of a corresponding pursing rope 26. Thereafter the section 1b is separated from the section 1c by drawing the connecting rope 25 out of the connecting rings 23, which thus can be moved apart, as is evident from the illustration of FIG. 8C. Thereafter the separated section 1b can be towed away with its contents or directly be hoisted up onto a ship for a pouring-out operation. The connection of empty collecting sections to the collecting device can suitably take place in the reverse order.

When the collecting device occupies a position in streaming water or is towed, the wall of the collecting device is bulged outwards behind the stay bodies 7 and, thus, forms a channel, along which the materials, which do not pass through the netmesh, but slide towards the collecting portion. The water on the other side traverses the network, which means that a limited quantity of water streams into the collecting portion 1. The water streaming into the collecting portion 1 escapes through its netmesh. When taking up separate collecting sections, they can be enclosed in a supplemental envelope, which is comparatively impermeable to liquids in order to make sure that no oil leaks out during the lifting up operation.

The invention is not limited to the embodiment described above and illustrated in the drawings by way of example only, but can be varied as to its details within the scope of the following claims. Thus it is not necessary that the wall of the collecting device is made of net for its whole height or length, but part of the same can comprise waterproof material. Thus, it is not either necessary that the stay bodies 7 also are floating bodies. The floating bodies can be loosely attached to separate stays, or else they can occupy a separate position at a distance from the stays along the wall of the collecting device without therefore departing from the fundamental idea of the invention, even if the embodiment shown is a preferred one.

We claim:

1. A device for collecting materials, including oil floating on water, said device having two upright floating walls converging on a collecting means to guide the materials into said collecting means during towing of the device, said collecting means comprising detachably interconnected hose-shaped sections capable of retaining collected material and including a forward section and a last trailing section constructed of a mesh dimensioned sufficiently small to retain said oil therewithin, the most forward section being connected to said floating walls and the last trailing section being pursed and sealed at the trailing end thereof during towing, means for coupling said hose-shaped sections in succession, including means for pursing and sealing the last trailing section and its contiguous section when the last trailing section has collected sufficient material to be removed, and means for separating said last trailing section after pursing and sealing thereof, designed to enable complete disconnection of said last trailing section from the remainder of said device after said pursing and sealing.

2. A device according to claim 1, wherein said means for coupling said sections together comprises a series of overlapping interconnected loops spaced circumferentially about the outer periphery of said contiguous sections and retained by a rope threaded through said loops.

3. A device according to claim 2, wherein each said section is provided with an additional series of loops spaced circumferentially about the outer periphery of each section and further spaced from the coupling loops and coupling rope, and a pursing rope threaded through said additional loops.

* * * * *